3,386,795
POLYESTERS HAVING IMPROVED DYEING PROPERTIES
John R. Caldwell and Russell Gilkey, Kingsport, Tenn., assignors to Eastman Kodak Company, Rochester, N.Y., a corporation of New Jersey
No Drawing. Filed Oct. 5, 1964, Ser. No. 401,721
8 Claims. (Cl. 8—100)

This invention relates to polymeric materials, and particularly to fiber-forming and film-forming linear polymers having improved dyeing properties.

A large number of synthetic linear condensation polymers are known to the art and are ordinarily prepared by reacting a polybasic organic acid with a polyhydric alcohol, with or without the use of a condensation catalyst. The high molecular weight products which are thereby obtained are capable of being drawn into oriented fibers of the type described in U.S. Patent 2,071,250. The usual polyester fibers such as those prepared from polyethylene terephthalate are very difficult to dye, however, and special methods must usually be employed in order to achieve any satisfactory degree of dyeing. Thus, at the present time, polyester fibers must be dyed at superatmospheric pressures with cellulose acetate dyes in order to obtain practical shades. This process requires the use of expensive equipment and is, of course, time consuming. An alternative process which has been used involves effecting the dyeing in the presence of a dye assistant or swelling agent such as phenol, cresol, benzoic acid, dichlorobenzene, or similar material. This process suffers the disadvantage, however, of often causing non-uniform swelling of the fiber with a resultant non-uniform application of the dye. Furthermore, the use of most dyeing assistants is objectionable because of expense, toxicity, objectionable odor, and the like.

It is also known in the art to prepare polyesters containing amide groups by using diamines or amino acids as reactants. In these poly(ester-amides) the amide group improves dyeability, but, is present as a link in the main valence chain and hence is chemically combined in the polymer molecule. Moreover, it is also taught in the art to use polyester intermediates that contain carboxamide, or carboxamide groups in side-chains. As is well known, however, the amino, amide and cyclo dicarboxylimido difunctional reactants used in the prior art tend to impart color to the polyester compositions to a degree depending upon the time and temperature of heating. This presents a problem when such reactants are employed since they must be present during the entire time required to prepare the polyester and hence are exposed to temperatures of 270–300° C. for periods of up to several hours. It is apparent that extensive color formation and decomposition can take place under these conditions.

It has further been proposed to improve the dyeing properties of polyesters by mixing thereinto linear polyamides prior to extrusion. This process, however, is very difficult to carry out on a practical scale because the polyamide must be ground to a very small particle size and intimately mixed with the polyester. It is well known that polyamides, because of their toughness, are highly resistant to grinding and other means of comminution. Furthermore, the carboxyl and/or amino end groups present in the polyamide react with the polyester and produce undesirable changes in properties.

Objects, therefore, of the present invention are: to provide polyester fibers that have improved dye affinity, especially for disperse dyes and premetallized dyes; to provide polyester fibers and films that can be dyed to deep shades wtih such dyes in the absence of dye carriers and without the use of superatmospheric pressure; and to provide a commercially practicable process for preparing such fibers and films.

These and other objects have been accomplished in accordance with present invention through the discovery of incorporating compounds (hereinafter referred to as modifiers) containing N-substituted carboximide groups in polyester compositions, as dispersions. These modifiers have a molecular weight of about 200 or higher and contain one or more nitrogen atoms in the form of carboximide groups. The modifiers are usually incorporated in the polyesters prior to spinning, extruding or other shaping operations. In some cases the desired results are obtained by applying the modifiers to the surface of polyester fibers or films and then following with a suitable heat treatment. The modifiers impart affinity for disperse and premetallized dyes by furnishing polar sites dispersed throughout the polyester matrix.

Furthermore, the products of the invention can be dyed without the use of expensive and toxic dyeing assistants or swelling agents and without the use of superatmospheric pressure. These advantages are the result of the present important and unpredictable discovery.

In regard to the difficulties of prior techniques, the modifiers of the present invention avoid them. The present modifiers are relatively low molecular weight compounds that are easily pulverized by the usual methods and when melted have practically no melt viscosity and are readily dispersed in the molten polyester. In contrast, the polyamides heretofore employed have high melt viscosities and the melted particles can be dispersed or reduced in size only by means of powerful mixing equipment. Moreover, since the present modifiers are simple compounds, they can be purified readily and do not contain reactive carboxyl or amino groups. Hence, they are entirely inert toward the polyester, even at elevated temperatures. Another and extremely important point is that the present modifiers only need be exposed to high temperatures during the extrusion operation which usually requires only a few minutes, and consequently do not produce objectionable color or polymer deterioration.

It is also quite surprising to find that these modifiers remain in the polyester fiber under stringent processing procedures including scouring, even though many of them are appreciably soluble in water or dry cleaning solvents. In this regard it has been found, quite unexpectedly, that the modifiers form stable complexes with the dye molecules, which complexes are fast toward laundering, dry cleaning and crocking. In other words, these modifiers, although only mechanically dispersed in the polyester, function as if they were chemically bound in the polymer chain. It is thus apparent that the present invention represents an entirely new concept in polyester technology, that is, imparting improved dye affinity by means of dispersed, low molecular weight compounds containing N-substituted carboximide groups.

The process of the invention is praticularly applicable, but, not limited to, all types of high-melting crystalline polyesters such as those obtained by reacting glycols with aromatic dicarboxylic acids such as terephthalic; 4,4'-dicarboxydiphenyl; 4,4' - sulfonyldibenzoic; 1,2-di(p-carboxyphenyl)ethane; 1,2 - di(p - carboxyphenoxy)ethane; naphthalenedicarboxylic acids, and the like. U.S. Patent 2,925,404 contains a list of other dicarboxylic acids useful in the present invention. Suitable glycols include the polymethylene glycols such as ethylene glycol, trimethylene glycol, tetramethylene glycol, pentamethylene glycol, hexamethylene glycol, decamethylene glycol, and the like. Also branched chain glycols such as 2,2-dialkyl-1,3-propanediols and 2-methylhexane-1,6-diol, and alicyclic glycols represented by quinitol, norcamphanediols, 1,4-cyclohexanedimethanol and 2,2,4,4-tetraalkyl-1,4-cyclobutanediols may be employed.

The process is further applicable to noncrystalline and slightly crystalline polyesters including some of the polycarbonates of bisphenols, the polyterephthalates of bisphenols and the polyisophthalates of bisphenols. The process is of such general utility that it may be applied advantageously to any type of polyester; see Wilfong, J. Poly. Sci., 54, 385 (1961) for further disclosure of useful polyesters.

The modifying compounds useful in practicing the present invention are diacylated nitrogen derivatives containing at least one carboximide group, the valences of which are satisfied by various radicals as shown by the formula

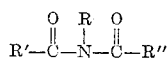

wherein R is selected from the group consisting of H, monovalent and polyvalent aliphatic, alicyclic, and aromatic radicals containing from 1 to 20 carbon atoms, and combinations thereof, and wherein R' and R'' are selected from the group consisting of mono and polyvalent aliphatic, alicyclic, and aromatic radicals containing from 1 to 20 carbon atoms, and combinations thereof, and wherein R' and R'' may be combined to form ring structures.

The diacylated nitrogen compounds have a molecular weight of at least 180 and preferably within the range of 250 to 1000. They may contain polar groups as substituents, such as phenolic hydroxyl, aromatic amino, and aliphatic tertiary amino. These modifiers are prepared by known procedures such as the reaction of primary amines with cyclic anhydrides as discussed in Houben-Weyl, Methoden der Organischen Chemie, Stickstoff Verbindungen II, p. 16, Georg Thieme Verlag, Stuttgart (1958). A typical preparation of the compound N,N'-hexamethylenediphthalimide

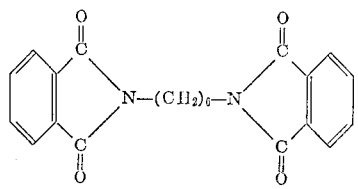

is as follows: a mixture of 325.6 g. (2.2 moles) of phthalic anhydride and 116 g. (1.0 mole) of 1,6-hexamethylenediamine was heated and stirred under nitrogen at 220° C. until molten. Water was rapidly evolved. The reaction mixture was stirred at 220° C. for 45 min. after water had ceased to be evolved. The product was allowed to cool and was recrystallized from 1 liter of acetic acid. It was dried with stirring at 70° C. under a reduced pressure of 3 mm. Hg. The yield of desired product was 351 g. melting at 183° C.

The diacylated nitrogen compounds may also be prepared by reacting monoacylated nitrogen compounds with anhydrides.

This method is discussed in Ritchter's Organic Chemistry, vol. I, p. 322, Nordeman Publishing Co., Inc. New York (1934).

From about 1% to about 25% and preferably from about 4% to about 10% of the diacylated nitrogen compound is used, based on the weight of the polyester. The diacylated nitrogen compound may be mixed with the melted polyester by means of hot rolls, sigma-blade mixers, etc. Alternatively, the diacylated nitrogen compound may be dissolved in a volatile solvent and the solution stirred with the polyester granules or particles. The solvent is then evaporated to leave the particles coated with the nitrogen compound. Fibers and films made by extruding these blends contain the nitrogen compound distributed uniformly throughout the cross section.

In one embodiment of the invention, the diacylated nitrogen compound is applied to the surface of polyester fibers, sheets, films and other shaped objects. The treated object is then heated to a temperature of about 100° to 250° C. in order to fuse the nitrogen compound into the polyester surface. The diacylated nitrogen compound may be suspended or dissolved in water or an organic solvent for this purpose. In a typical case, the nitrogen compound may be dissolved in alcohol or acetone and a polyester fabric is padded with the solution. After the solvent has evaporated, the treated fabric is heated at 180–200° C. for 1–3 minutes. The nitrogen compound is fused into the polyester and is not removed by abrasion or washing. The treated fabric has greatly improved dye affinity. Polyester films can be treated in a similar way.

Example 1.—Polyethylene terephthalate polyester with an inherent viscosity of 0.69 was ground to a particle size of about 3 mm. or less in diameter. One hundred eighty grams of the polyester particles were slurried in 200 ml. of a methylene chloride solution containing 20 g. of dissolved N,N'-hexamethylenediphthalimide. The slurry was stirred while evaporating the acetone to obtain a coating of the N,N'-hexamethylenediphthalimide on the polyester particles. The coated polyester was dried at 120° C. for 2 hrs. and melt spun into fibers. The fibers contained an intimate dispersion of the N,N'-hexamethylenediphthalimide in the polyester matrix. The spun fibers were drawn 4 times their original length and stabilized by heating at 140° C. at constant length for 5 min. A 3% dyeing of these fibers with Eastman Blue GLF disperse dye for 1 hr. at the boil gave a depth of shade possible with stabilized polyethylene terephthalate fibers under similar conditions only with superatmospheric pressure or with a carrier. The physical properties of N,N'-hexamethylenediphthalimide modified polyester are essentially the same as those of unmodified polyethylene terephthalate. The dyed fibers are fast to light and washing.

Example 2.—A mixture of 352 g. of polyethylene terephthalate particles of about 3 mm. or less in diameter and 48 g. of powdered N,N'-dibutylpyromellitimide of the formula

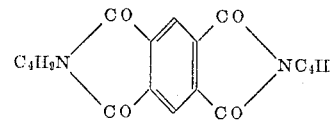

was melt extruded in a screw-fed extruder to blend the two materials. The extruded polyester was water quenched in the form of an eighth-inch diameter rod which was chopped into pellets about one-eighth inch long. The pellets were dried by heating in a circulating air oven at 120° C. for 2 hrs. The resulting intimate mixture of polyester and N,N'-dibutylpyromellitimide containing 12% of the modified was melt spun into fibers. The fibers were drawn and stabilized as described in Example 1. The fibers dyed to deep shades with disperse dyes at the 3% level in ordinary equipment and without a carrier. A polyethylene terephthalate control only dyed to light shades under the same conditions.

Example 3.—A 6-inch by 8-inch strip of polyethylene terephthalate fabric having a tropical worsted construction was coated with 5% of N,N'-hexamethylenediphthalimide from a methylene chloride solution. The coated fabric was heated at 200° C. for 3 minutes. The compound migrated into the polyester under these heating conditions. The coated fabric dyed to heavy shades with disperse dyes without a carrier. The dyed fabric was fast to light, washing and dry cleaning. This shows that the dyeable modifier penetrated the polyester and is not merely on the surface.

Example 4.—N,N'-ethylenedioxybispropylenediphthalimide of the formula

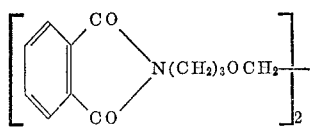

was metered into polyethylene terephthalate melt in a screw extruder at varying rates so that melt-spun fiber containing 4.2, 7.8, and 11.1% of the dyeable modifier was obtained. Each of the fiber compositions was drawn 400–500% and then heated at 140° C. at constant length for 5 minutes. Three percent dyeings for one hour at the boil with Eastman Fast Blue BLF and Eastman Fast Yellow 4RLF were made. The shade of dyeing ranged from medium to heavy as the amount of modifier increased from 4.2 to 11.1%. These shades of dyeing are possible for polyethylene terephthalate under similar conditions only by adding dyeing assistants. Since the amount of dyeing assistant (or carrier) added is based on the volume of solution in the dyebath, this method of increasing dyeability is quite expensive. The properties of the N,N'-ethylenedioxybispropylenediphthalimide modified polyester fibers are essentially unchanged when compared with polyethylene terephthalate.

Example 5.—N,N'-hexamethylenediphthalimide was melted and metered into continuous melt polymerized polyethylene terephthalate just prior to extrusion into one-eighth inch diameter rod. The inherent viscosity of the modified polyester was 0.64. It contained 15% by weight of the N,N'-hexamethylenediphthalimide. The rod was chopped into pellets and dried. Fibers melt spun from this composition dyed readily with disperse dyes without the aid of a dyeing assistant. Extruded films dyed readily.

Example 6.—A masterbatch containing 65% polyethylene terephthalate and 35% N,N'-ethylene-1,2-norbornanedicarboxyimide of the formula

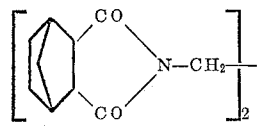

was prepared by melt blending the polyester and imide derivative in a sigma blade mixer at 270° C. in a nitrogen atmosphere. The masterbatch was ground in a Wiley mill and mixed with polyethylene terephthalate in a ratio of 1 part to 4 parts by weight. The mixture was melt spun in a screw-fed extruder. The fibers contain 93% polyethylene terephthalate and 7% N,N'-ethylene-1,2-norbornanedicarboximide. They dye readily with disperse dyes and a dyeing assistant is not needed to obtain deep shades.

Example 7.—The following compositions were melt spun into fibers. The dyeable modifier was blended with the polyester prior to spinning by pre-extrusion as described in Example 2. These compositions are described in Table 1.

TABLE 1

| Polyester | Modifier | Percent by Wt. Modifier in Polyester Fiber |
|---|---|---|
| Poly-1,4-cyclohexylenedimethylene terephthalate | [phthalimide-N(CH₂)₃-]₂ structure | 11.2 |
| Poly-1,4-tetramethylene-4,4'-diphenyl dicarboxylate | Same as above | 9.6 |
| Poly-1,5-pentamethylene-4,4'-sulfonyldibenzoate | do | 10.5 |
| Polyethylene-2,6-naphthalene dicarboxylate | do | 12.3 |
| Polyethylene-4,4'-ethylenedibenzoate | do | 8.4 |
| Polyethylene-4,4'-ethylenedioxydibenzoate | do | 9.0 |
| Poly-2,2,4,4-tetramethyl-1,3-cyclobutylene terephthalate | do | 7.4 |
| Poly-2,2,4,4-tetramethyl-1,3-cyclobutylene carbonate | do | 6.8 |
| Polyethylene terephthalate | succinimide-phenyl-CH₃ structure | 9.5 |
| Polyethylene terephthalate | C₈H₁₇-N / N-C₈H₁₇ bicyclic diimide structure | 12.5 |
| Polyethylene terephthalate | C₄H₉-N / N-C₄H₉ naphthalene bisimide structure | 11.6 |

TABLE I—Continued

| Polyester | Modifier | Percent by Wt. Modifier in Polyester Fiber |
|---|---|---|
| Polyethylene terephthalate | $\left[-CH_2-O(CH_2)_3-N\begin{array}{c}COC_2H_5\\COC_2H_5\end{array}\right]_2$ | 7.0 |
| Polyethylene terephthalate | (bis-camphorimide-methyl benzene structure) | 10.0 |
| Polyethylene terephthalate | (bis-camphorimide ether structure) | 5.7 |
| Polyethylene terephthalate | phthalimide-N-(p-diethylaminophenyl) | 5 |
| Polyethylene terephthalate | phthalimide-N-(p-hydroxyphenyl) | 3 |
| Polyethylene terephthalate | phthalimide-N-(m-chlorophenyl) (with ether bridge) | 15 |

The fiber compositions described in Table 1 were dyed with the disperse dyes, Eastman Fast Blue GLF, Eastman Fast Yellow 4RLF and Eastone Brilliant Fast Red 2BGLF. No carrier was used in the dye bath. Three percent dyeings for 1 hr. at 100° C. gave medium to deep shades. Control dyeings on the unmodified polyester produced light shades. Three percent dyeings with Neutracyl Red B (a premetallized dye) on the fiber compositions described in Table 1 also gave medium to heavy shades compared with light shades on the unmodified polyester control.

The above disperse and premetallized dyes are only representative of those useful in the present invention. Such disperse dyes may generally be described as water insoluble dyes which are dispersed by known techniques in water and applied as much to textile fibers in which the dyes literally dissolve to give the desired coloration. An extensive list of useful disperse dyes is given on pages 292–293 of the 1961 edition of the Technical Manual of the American Association of Textile Chemists and Colorists, vol. 37.

Among the multitudinous variety of useful disperse dyes are the anthraquinone type as disclosed in U.S. Patents 3,087,773; 2,992,240; 2,255,045; 2,398,454; 2,641,602; 3,082,218; 3,106,438; and French Patent 1,292,734; the azo type as disclosed in U.S. Patents 2,659,719; 2,264,303; 2,258,979; 2,785,157; and 2,183,997; the disazo type as disclosed in U.S. Patents 2,782,185; 3,096,140; 3,099,652; and 2,832,761; the diphenylamine type as disclosed in U.S. Patents 2,422,029 and 2,466,011; the methine type as disclosed in U.S. Patents 1,950,421; 2,043,081; 2,053,819; 2,120,401; 2,179,895; 2,206,108; 2,806,872; 2,811,544; 2,936,319; 2,077,063; 2,155,459; and 2,764,466; and other well known types such as the bispyrazolone and the trisazo types.

Among the useful premetallizable dyes are those disclosed in U.S. Patents 3,099,652; 2,832,761; 2,908,677; 3,040,020; 3,045,003; 3,051,696; 3,058,974; 3,062,802; 3,078,267; 3,096,319; and 3,114,745. It is of course understood that the above noted disperse and premetallized dyes are only representative of the large variety of dyes which contain no particularly reactive groups such as carboxyl or hydroxyl and yet appear to become considerably more miscible, soluble or dispersable in polyesters by virtue of the presence therein of the presently disclosed modifiers.

The invention has been described in detail with particular reference to preferred embodiments thereof but it will be understood that variations and modifications can be effected within the spirit and scope of the invention as described hereinabove and as defined in the appended claims.

We claim:
1. The process of improving the dyeability of polyesters, comprising intimately blending therewith from about 1 to about 25% by weight of at least substantially colorless compound having a molecular weight of from about 180 to about 1000 and containing at least one carboximide group, the valences of which are satisfied by various radicals as shown by the formula

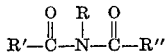

wherein R is selected from the group consisting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures.

2. The process for improving the dyeability of polyesters, comprising intimately blending a melt thereof with a melt of from about 1 to about 25% by weight of at least substantially colorless compound having a molecular weight of from about 180 to about 1000 and containing at least one carboximide group, the valences of which are satisfied by various radicals as shown by the formula

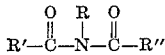

wherein R is selected from the group consisting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures.

3. The process for improving the dyeability of polyesters, comprising slurrying comminuted polyester with a solution of at least substantially colorless compound having a molecular weight of from about 180 to about 1000 and containing at least one carboximide group, the valences of which are satisfied by various radicals as shown by the formula

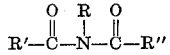

wherein R is selected from the group consisting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures.

4. The process for preparing polyester fibers having substantially improved affinity for disperse and premetallized dyes, comprising slurrying comminuted polyester with a solution of at least substantially colorless compound having a molecular weight of from about 180 to about 1000 and containing at least one carboximate group, the valences of which are satisfied by various radicals as shown by the formula

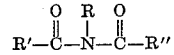

wherein R is selected from the group consisting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures, drying the coated polyester particles and thereafter melt spinning the same.

5. The process for improving the dyeability of polyester fibers, comprising coating the fibers with at least substantially colorless compound having a molecular weight of from about 180 to about 1000 and containing at least one carboximide group, the valences of which are satisfied by various radicals as shown by the formula

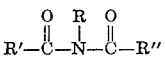

wherein R is selected from the group consisting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures, and thereafter heating the coated fibers at a temperature sufficiently high to fuse said compound and cause it to penerate into the surface of said fibers.

6. Polyester fibers containing dispersed dye and at least substantially colorless compound having a molecular weight of from about 180 to about 1000 and containing at least one carboximide group, the valences of which are satisfied by various radicals as shown by the formula

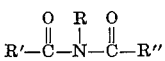

wherein R is selected from the group consisting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures.

7. Polyester fiber having enhanced dye affinity containing from about 1 to about 25% by weight of colorless compound having a molecular weight of from about 180 to 1000 and containing at least one carboximide group, the valences of which are satisfied by the various radicals as shown by the formula

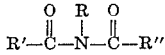

wherein R is selected from the group consosting of H, monovalent and polyvalent aliphatic, alicyclic, and aromatic radicals containing from 1 to 20 carbon atoms, and combinations thereof, and wherein R' and R" are selected from the group consisting of mono and polyvalent aliphatic, alicyclic, and aromatic radicals containing from 1 to 20 carbon atoms, and combinations thereof, and wherein R' and R" may be combined to form ring structures.

8. Polyester fiber according to claim 7 wherein said compound is selected from the group consisting of compounds having the formulas

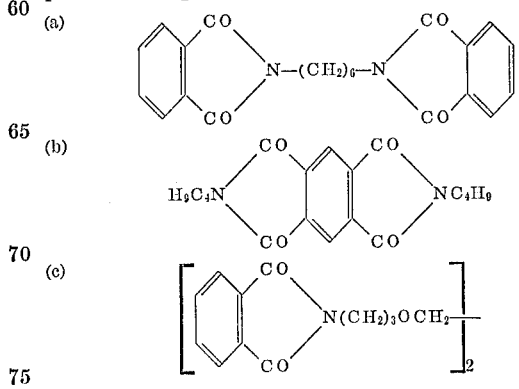

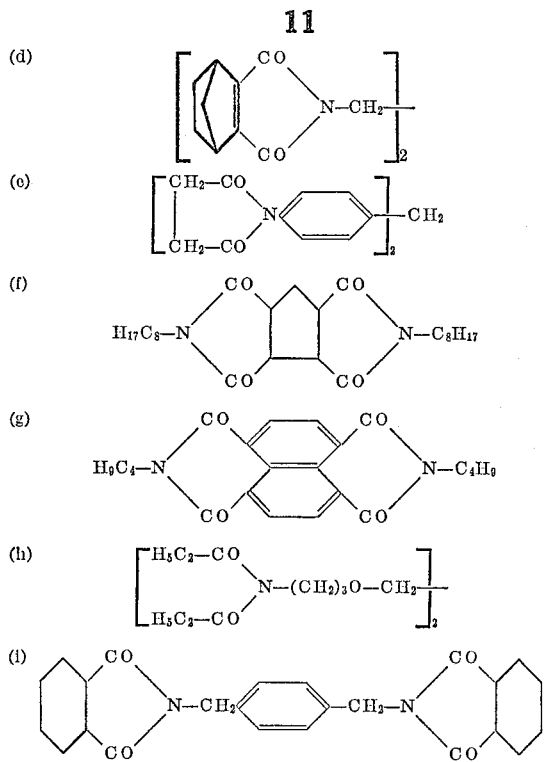
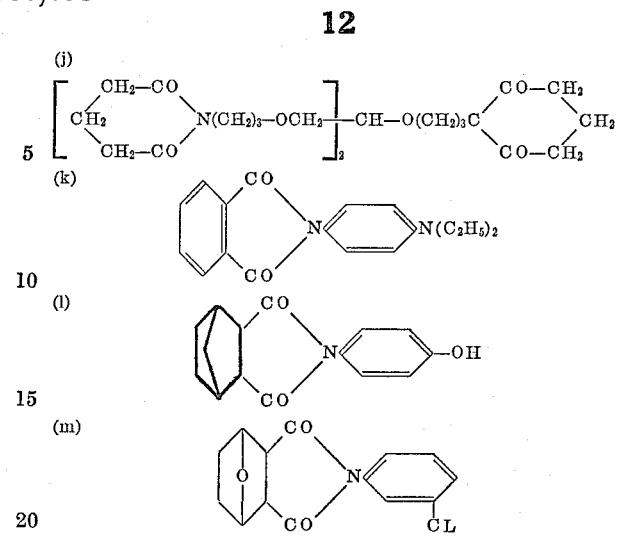
References Cited
UNITED STATES PATENTS
3,305,603  2/1967  McIntyre _____ 2—55
2,777,830  5/1953  Shivers et al. _____ 8
2,628,963  2/1953  Laucius et al. _____ 8—55
MORRIS LIEBMAN, *Primary Examiner.*
R. S. BARON, *Assistant Examiner.*

UNITED STATES PATENT OFFICE
CERTIFICATE OF CORRECTION

Patent No. 3,386,795            June 4, 1968

John R. Caldwell

It is certified that error appears in the above identified patent and that said Letters Patent are hereby corrected as shown below:

Column 9, line 2, "of improving" should read -- for improving --; line 63, "carboximate" should read -- carboximide --. Column 10, line 49, "consosting" should read -- consisting --. Column 12, formula (j) should appear as shown below:

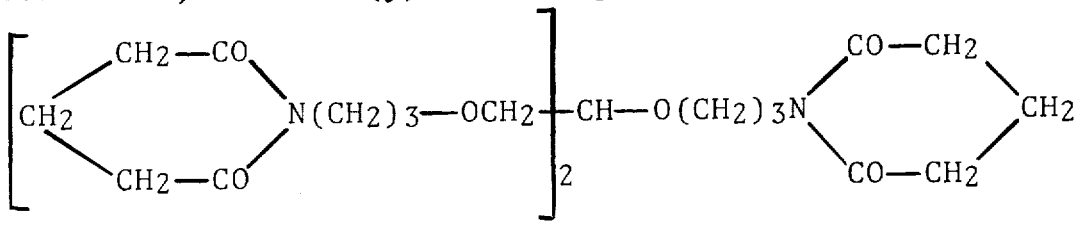

Signed and sealed this 25th day of November 1969.

(SEAL)
Attest:

EDWARD M. FLETCHER, JR.
Attesting Officer

WILLIAM E. SCHUYLER, JR.
Commissioner of Patents